US009085305B2

(12) United States Patent
Pumpelly (10) Patent No.: US 9,085,305 B2
(45) Date of Patent: Jul. 21, 2015

(54) HYBRID PERSONAL TRANSIT SYSTEM

(71) Applicant: Thomas Pumpelly, Mason Neck, VA (US)

(72) Inventor: Thomas Pumpelly, Mason Neck, VA (US)

(*) Notice: Subject to any disclaimer, the term of this patent is extended or adjusted under 35 U.S.C. 154(b) by 159 days.

(21) Appl. No.: 13/707,249

(22) Filed: Dec. 6, 2012

(65) Prior Publication Data

US 2014/0158014 A1    Jun. 12, 2014

(51) Int. Cl.
| | |
|---|---|
| *B61F 13/00* | (2006.01) |
| *B61C 13/00* | (2006.01) |
| *B60L 9/00* | (2006.01) |
| *B61B 13/04* | (2006.01) |
| *B61B 15/00* | (2006.01) |
| *E01B 5/02* | (2006.01) |
| *B60L 3/00* | (2006.01) |
| *B60L 7/14* | (2006.01) |
| *B60L 9/24* | (2006.01) |
| *B60L 11/14* | (2006.01) |
| *E01B 25/08* | (2006.01) |

(52) U.S. Cl.
CPC ............... *B61C 13/00* (2013.01); *B60L 3/0046* (2013.01); *B60L 3/0061* (2013.01); *B60L 7/14* (2013.01); *B60L 9/00* (2013.01); *B60L 9/24* (2013.01); *B60L 11/14* (2013.01); *B61B 13/04* (2013.01); *B61B 15/00* (2013.01); *B61F 13/00* (2013.01); *E01B 5/02* (2013.01); *E01B 25/08* (2013.01); *B60L 2200/26* (2013.01); *B60L 2220/12* (2013.01); *B60L 2240/12* (2013.01); *B60L 2250/10* (2013.01); *B60L 2250/16* (2013.01); *B60L 2270/145* (2013.01); *Y02T 10/70* (2013.01)

(58) Field of Classification Search
CPC .......... B61F 13/00; B61B 10/04; B61B 13/04; B61B 15/00; B61C 13/00; B60L 9/00
USPC ............... 104/120, 290; 105/133, 145, 215.1, 105/215.2
See application file for complete search history.

(56) References Cited

U.S. PATENT DOCUMENTS

| | | | | |
|---|---|---|---|---|
| 2,853,956 | A | * | 9/1958 | Wenner-Gren et al. ....... 104/120 |
| 5,813,349 | A | | 9/1998 | Jensen |
| 6,012,396 | A | | 1/2000 | Schulz |
| 6,029,104 | A | | 2/2000 | Kim |
| 6,095,054 | A | | 8/2000 | Kawano et al. |

(Continued)

FOREIGN PATENT DOCUMENTS

| | | | | |
|---|---|---|---|---|
| GB | 548420 | * | 10/1942 | ............. B60L 15/20 |
| JP | 05-162516 A | | 6/1993 | |
| JP | 2006088802 A | | 4/2006 | |

OTHER PUBLICATIONS

International Search Report dated Aug. 27, 2009 from corresponding international patent application No. PCT/US09/037918, 3 pages.

(Continued)

*Primary Examiner* — Zachary Kuhfuss
(74) *Attorney, Agent, or Firm* — Maier & Maier, PLLC (57) ABSTRACT

A system and method for hybrid personal transit and a hybrid personal transit vehicle. The vehicle can include an enclosure and a suspension system including a plurality of wheels, the suspension system adapted to control a positioning of the wheels over a range from substantially vertical to substantially horizontal, wherein the positioning of the wheels is substantially vertical for engaging a road surface, and wherein the positioning of the wheels is substantially horizontal for engaging a rail.

13 Claims, 12 Drawing Sheets

(56) References Cited

U.S. PATENT DOCUMENTS

| | | |
|---|---|---|
| 6,182,576 B1 | 2/2001 | Svensson |
| 6,263,799 B1 | 7/2001 | Pardes |
| 6,324,994 B1 | 12/2001 | Glenn |
| 6,619,212 B1 | 9/2003 | Stephan et al. |
| 6,857,374 B2 | 2/2005 | Novacek |
| 2002/0189489 A1 | 12/2002 | Henderson |
| 2003/0173173 A1 | 9/2003 | Stephan et al. |
| 2003/0173174 A1 | 9/2003 | Stephan et al. |
| 2005/0279242 A1 | 12/2005 | Maier et al. |
| 2006/0201376 A1 | 9/2006 | Brigham |
| 2007/0289477 A1 | 12/2007 | Sobolewski |
| 2009/0032350 A1* | 2/2009 | Shapery .......... 191/10 |
| 2010/0011986 A1 | 1/2010 | Pumpelly |
| 2010/0043665 A1 | 2/2010 | Brigham |
| 2011/0226151 A1 | 9/2011 | Pumpelly |

OTHER PUBLICATIONS

General Information for the Liberator Car, MonoMobile Corporation (2 pages), www.liberatorcar.com.

General Information of MonoMobile Company (8 pages), www.monomobile.com.

International Search Report and Written Opinion in PCT/US2013/073610 dated Mar. 14, 2014.

* cited by examiner

HYBRID PERSONAL TRANSIT SYSTEM

BACKGROUND

While numerous systems of high speed transportation have been developed, including several for low occupancy vehicles, none have reached the point of general applicability to today's traveling public and certainly not to the level of attraction for individuals. None of the personal units, now operational, have developed any significant speed capability.

Many of the systems currently in operation depend on a significant infrastructure. Each system requires a user to migrate from their personal form of transportation to a system car or vehicle.

While train systems meet many of the standards of high speed, wide area transportation, they have experienced no substantial gain in ridership percentage over the recent history, and have become very expensive to construct. Personal automobiles provide much of surface transportation, and this percentage has increased over the past two decades.

To understand why rail and personal rapid transit (PRT) systems have not been successful in attracting a higher percentage of surface transportation usage, we need look no further than the psychology of the American automobile owner, and a trend that is expanding globally as automobile ownership reaches into the depths of world population.

Americans want to own or lease, for several years or longer, their automobiles, vans, sport utility vehicles and personal trucks. Pride of ownership is paramount. Vehicles may be a reflection of a person's ego and sense of worth. They are often customized and almost always chosen for their options, colors, and curb appeal. A person, under the current parameters of transportation, simply will not likely give up their pride of ownership, or the degree of flexibility that a personal vehicle offers.

SUMMARY

According to at least one exemplary embodiment, a system and method for hybrid personal transit and a hybrid personal transit vehicle are disclosed. The vehicle can include an enclosure and a suspension system including a plurality of wheels, the suspension system adapted to control a positioning of the wheels over a range from substantially vertical to substantially horizontal, wherein the positioning of the wheels is substantially vertical for engaging a road surface, and wherein the positioning of the wheels is substantially horizontal for engaging a rail. The system can include at least one rail, the rail including a top portion and a center portion, wherein the center portion has a narrower cross-sectional width than the top portion, and a plurality of sensors configured to communicate with at least one personal transit vehicle.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION

Aspects of the HPT are disclosed in the following description and related drawings directed to specific embodiments of the HPT system. Alternate embodiments may be devised without departing from the spirit or the scope of the HPT system. Additionally, well-known elements of exemplary embodiments of the HPT system will not be described in detail or will be omitted so as not to obscure the relevant details of the HPT system. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the HPT system" or "embodiments" do not require that all embodiments of the HPT system include the discussed feature, advantage or mode of operation.

Hybrid Personal Rapid Transit/Transportation ("HPT") refers to a system of combined highway and monorail transportation methods, which may provide roadworthy HPT vehicles to transition onto, and run on, a system of monorails. The rails can be built on the ground, on poles, or in tunnels. A modified wheel and suspension system can allow the wheels of the vehicle to alternate between a substantially vertical position for engaging the roadway and a substantially horizontal position for engaging the rail.

Generally referring to FIGS. 1-13, an exemplary embodiment of an HPT vehicle 100 may be powered by a hybrid electric engine, battery operated, or utilize an internal combustion engine. An exemplary embodiment of an HPT vehicle may also be propelled by an electromagnetic propulsion system, for example by the use of magnetic induction motors such as linear induction motors. Exemplary embodiments of HPT vehicles may further be powered or propelled by any other propulsion mechanism known to one skilled in the art of vehicle mechanics.

For example, an HPT vehicle can be powered by electric power, either alternating current or direct current. This electric power can be supplied by any number of sources including, but not limited to, internal generation, internal storage such as batteries, or electrical current supplied via the rail system 108 by electrical supply 604, shown in FIG. 6. Other exemplary power sources may include combustion engines fueled by gasoline, diesel, hydrogen or compressed natural gas or similarly, an electrical generator fueled by gasoline, diesel, hydrogen or compressed natural gas can also be used as a power source for an HPT vehicle. In some exemplary embodiments, the HPT vehicle can include onboard power sources as a complement, or as a backup to the current supplied by the rail system 108.

Figure 1:
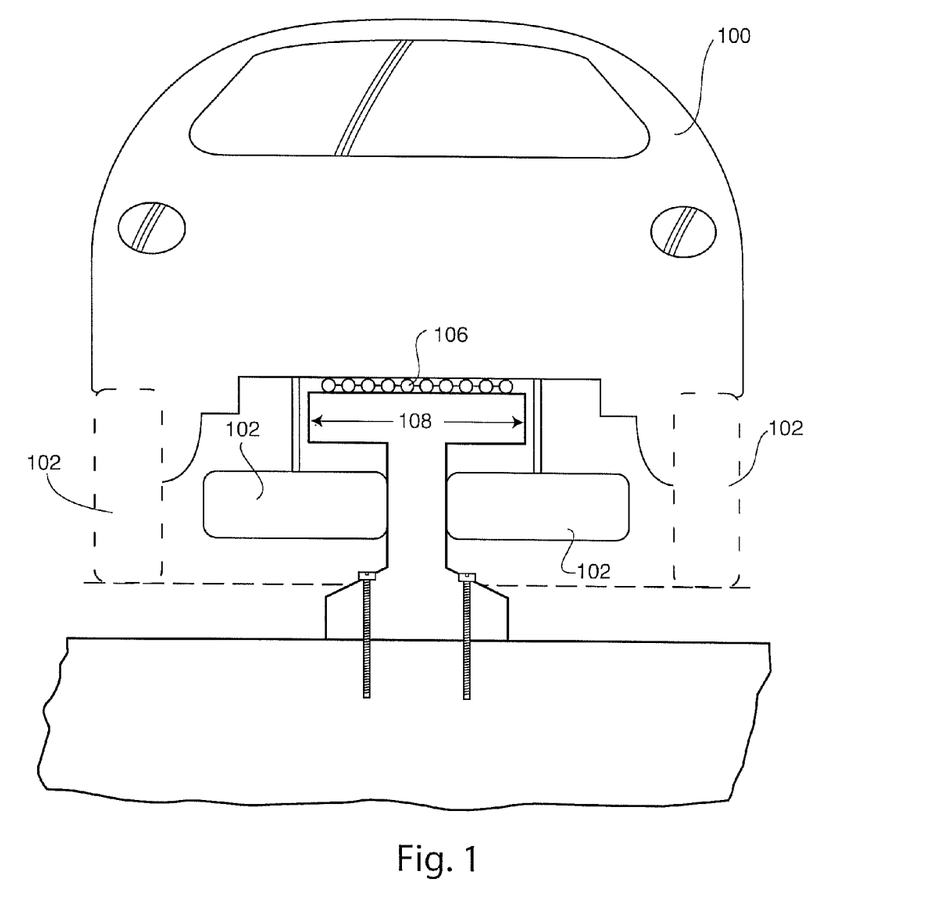
FIG. 1 is a front view of an exemplary embodiment of an HPT vehicle riding a rail.

In an exemplary embodiment, as seen in FIG. 1, an HPT vehicle 100 may include a plurality of vehicle wheels 102. The wheels 102 may be made of solid rubber, air inflated rubber or any other desired shock absorbing material. The wheels 102 may be powered so as to provide propulsion for the vehicle. The wheels 102 may be coupled to a suspension system that can pivot wheels 102 between a substantially vertical position (shown in dotted lines) and a substantially horizontal position (shown in solid lines). When wheels 102 are in the substantially vertical position, vehicle 100 may be driven on a conventional roadway. When vehicle 100 is operating on rails 108, wheels 102 may be retracted to a substantially horizontal position so as to engage the rail 108. This transition of the wheels 102 between a vertical position and a horizontal position may be facilitated by the suspension system. The suspension system may be controlled by a computerized system, for example by an onboard operating system 800, which may be in communication with a grid operating system 602. The operating systems 800, 602 may control all aspects of the positioning of the suspension system, and may determine the appropriate position of the wheels 102 depending on the status and location of the vehicle 100. For example, operating systems 800, 602 may automatically control wheel 102 positioning for conventional driving, for driving on the rail system 108, as well as during the approach and exit of vehicle 100 from the rail system.

Figure 11:
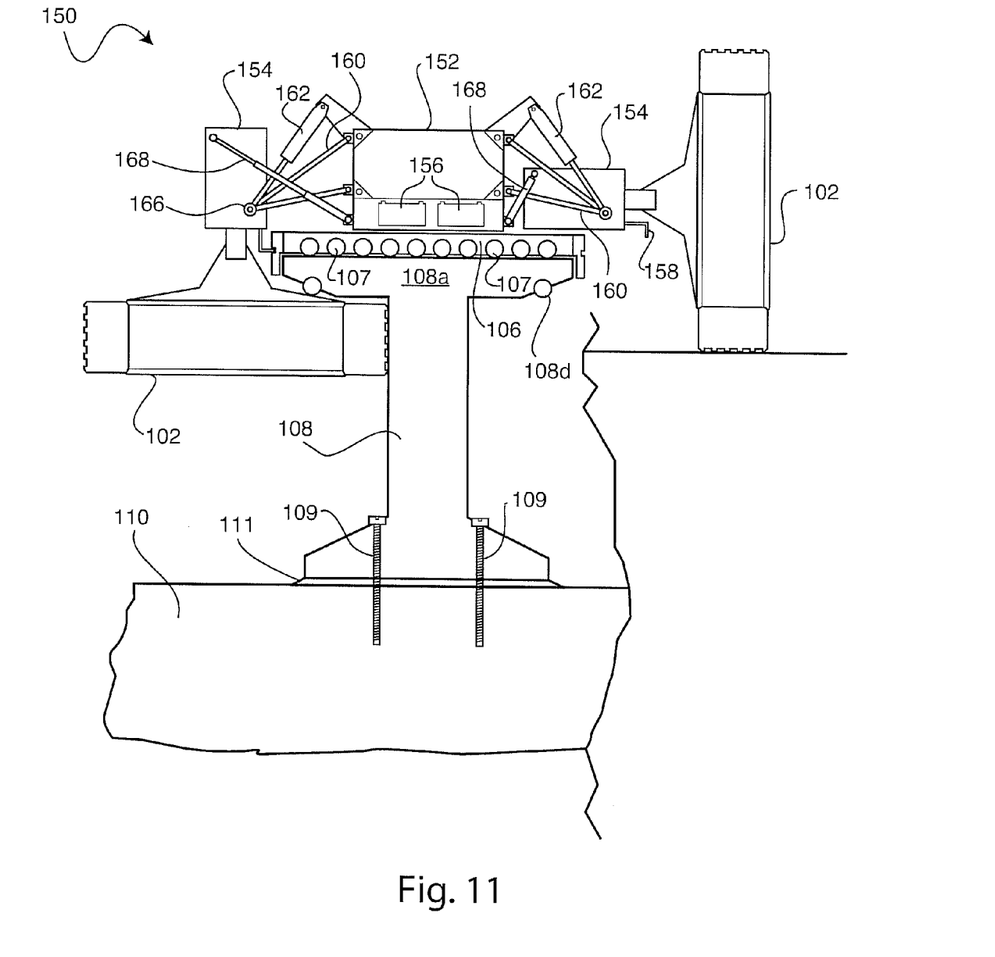
FIG. 11 is a front view of an exemplary embodiment of a suspension system for an HPT vehicle.

FIG. 11 shows an exemplary embodiment of a suspension system 150 for an HPT vehicle 100. Suspension system 150 may include at least one subframe 152. For example, a first subframe 152 may function as the front subframe of HPT vehicle 100 while a second subframe 152 may function as the rear subframe of HPT vehicle 100. Coupled to a first side of subframe 152 may be a first motor housing 154, and coupled to a second side of subframe 152 may be a second motor housing 152. Each motor housing 152 can have a motor therein, the motor being adapted to drive a corresponding wheel 102, the wheel 102 being rotatably coupled to the motor housing 154. Each motor for powering wheels 102 may be connected to one of two electrical buses via fused circuitry as known in the art.

In some exemplary embodiments, an HPT vehicle 100 may utilize its own battery power to operate the drive motors, while power sourced from electrical supply 604 may be utilized to charge the batteries 156 of vehicle 100. This can facilitate elasticity in transmission of power through the HPT system. However, power from supply 604 may be routed directly to the motors if desired, for example in the event of battery depletion or failure. Furthermore, in some exemplary embodiments, motor housing 154 may include an electrical pickup connector 158. When HPT vehicle 100 is engaged with a rail 108, electrical pickup connector 158 may be placed in electrical communication with electrical supply 604 of the rail system, if desired.

Each motor housing 154 may be coupled to subframe 152 via an arrangement of suspension arms 160, which may be any suspension arm arrangement known in the art that enables HPT vehicle 100 to function as described herein. Furthermore, at least one shock absorber 162 may be coupled to and extend between subframe 152 and motor housing 154. Furthermore, each motor housing 154 may be pivotably coupled to suspension arms 160, allowing the motor housing 154 and associated wheel 102 to pivot about an axis passing substantially horizontally through pivotable coupling 166 and substantially parallel to the longitudinal axis of HPT vehicle 100. The pivoting action of motor housing 154 may be facilitated by at least one variable-length actuator 168 coupled to and extending between subframe 152 and motor housing 154. As shown on the left of FIG. 11, when variable-length member 168 is in a first position, wheel 102 may be oriented in a substantially horizontal position for engaging a rail. As shown on the right of FIG. 11, when variable-length member 168 is in a second position, wheel 102 may be oriented in a substantially vertical position for engaging a roadway.

Variable-length actuator 168 may be a jackscrew, a hydraulic telescoping actuator, or any other device known in the art that enables vehicle 100 to function as described herein. An exemplary suspension system may include, for example an hydraulic actuator that may produce the requisite pressure to facilitate the desired positioning of wheels 102 during conventional or rail 108 use. The hydraulic actuator may be powered by an engine of the HPT vehicle 100, by electrical power, by reverse hydraulic operation or any other desired power source.

Another exemplary suspension system may include, for example an air compression actuator that may produce the requisite pressure to facilitate the desired positioning of wheels 102 during conventional or rail 108 use. The air compression actuator may be powered by an engine of the HPT vehicle 100, by electrical power, by reverse air compression operation, an alternate component of the HPT vehicle 100, return springs or any other desired power source. Additionally, the exemplary suspension system may include any desired combination of hydraulic and air compression actuation, coupled with natural gravity forces, that may produce the requisite pressure to facilitate the desired positioning of wheels 102.

Another exemplary suspension system may allow for the wheels 102 to be lowered to the vertical position by the force of gravity. In such an embodiment, the wheels may be released from the horizontal position and allowed to descend to the vertical position without additional input of power. For raising the wheels from the vertical position to the horizontal position, any desired power and actuator system may be utilized, including the ones described herein.

Figure 2:
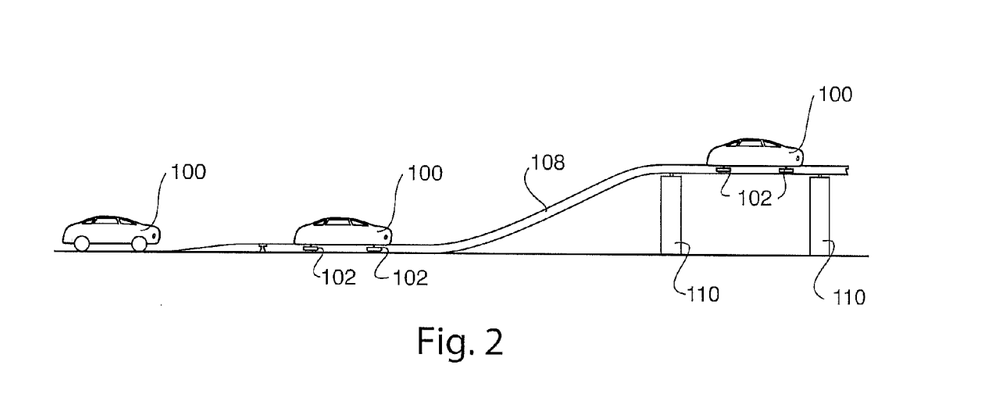
FIG. 2 is a side view of an exemplary embodiment of a HPT system, including HPT vehicles and a rail.
Figure 3:
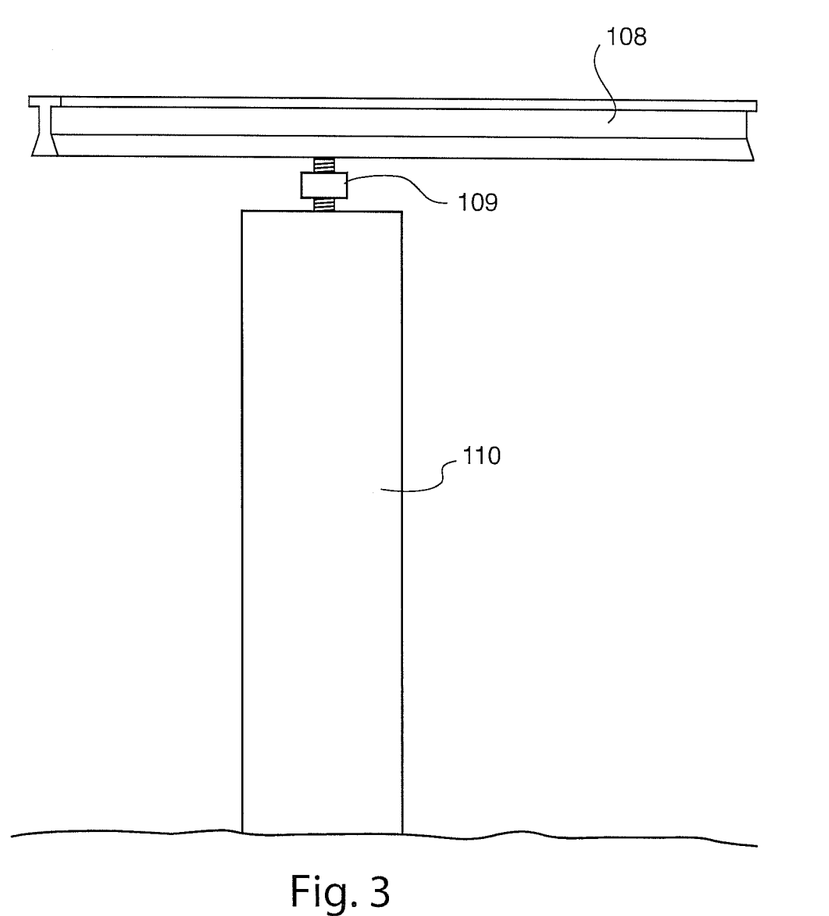
FIG. 3 is a perspective view of an exemplary embodiment of an HRPT rail.
Figure 4:
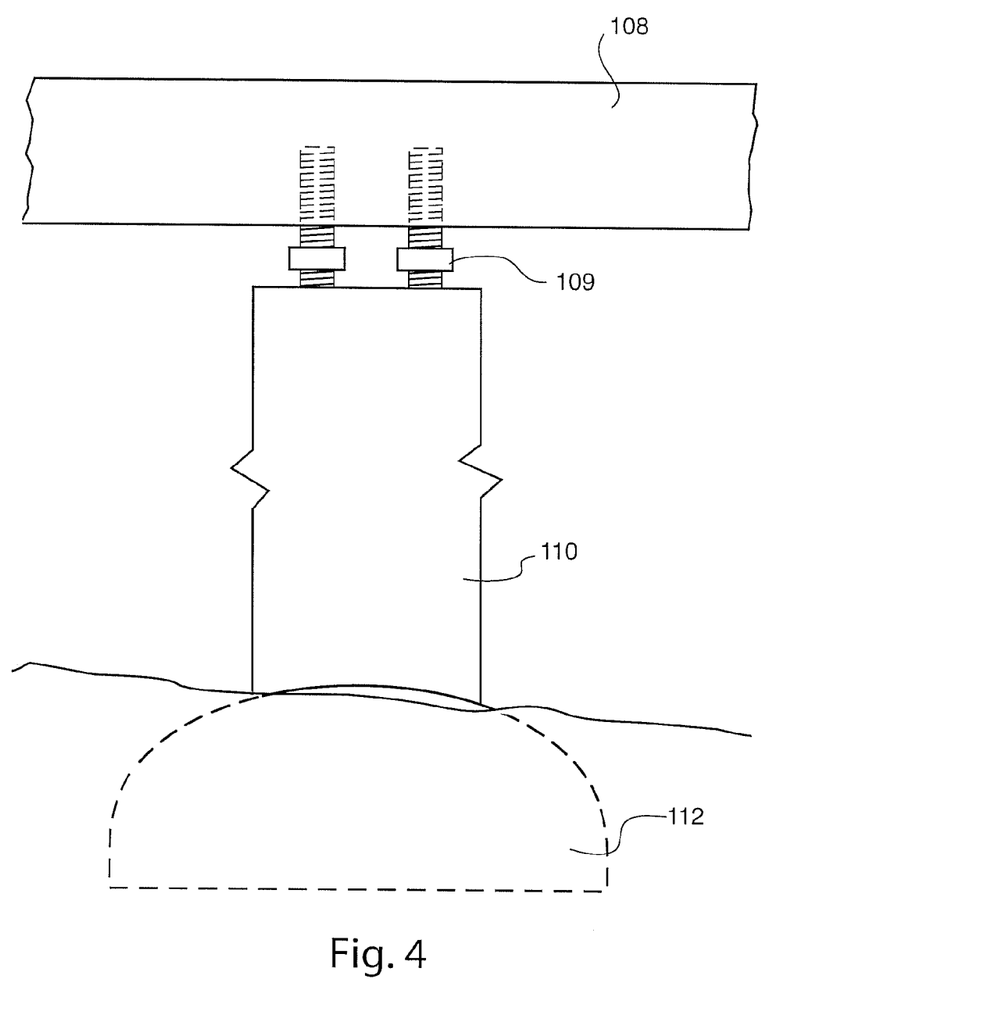
FIG. 4 is a side view of an exemplary embodiment of an HPT rail.
Figure 9:
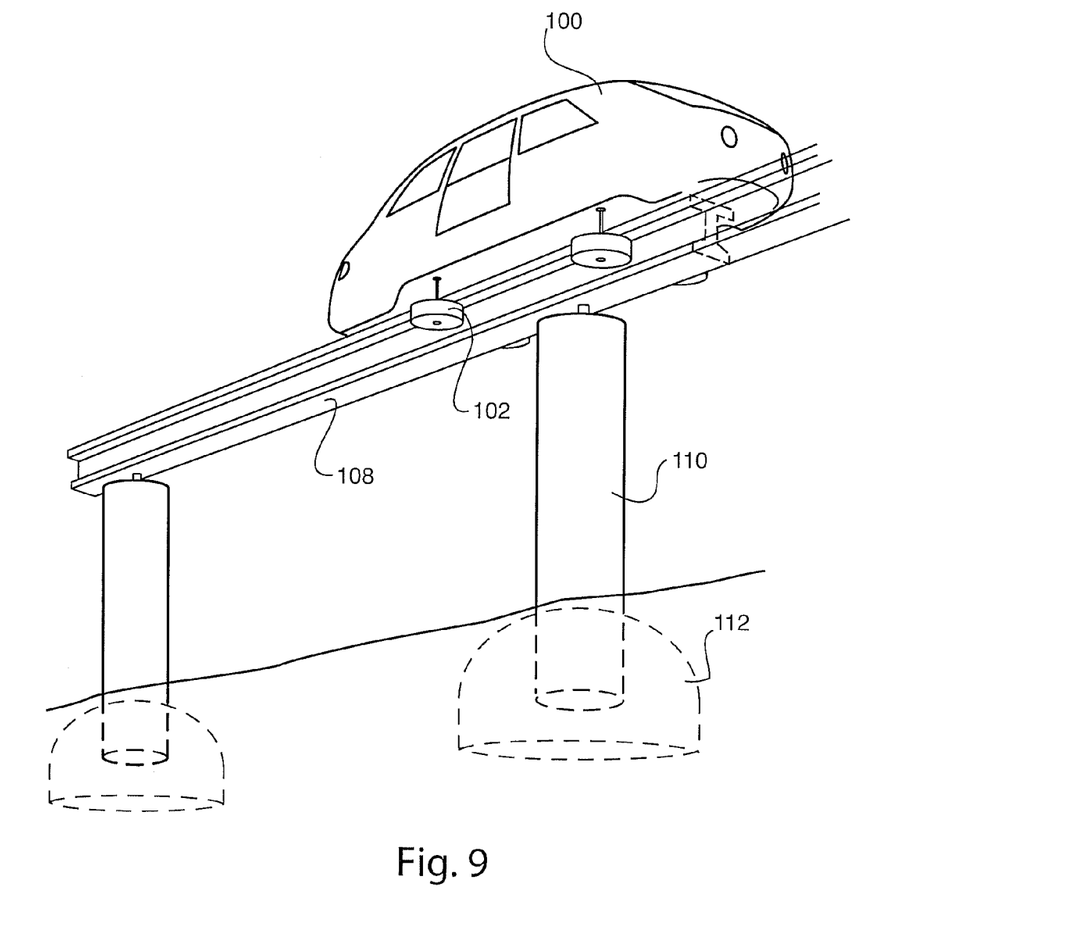
FIG. 9 is another perspective view of an HPT system with an HPT vehicle and rail.

In an exemplary embodiment, HPT vehicle 100 may integrate user initiated controls in order to facilitate the desired positioning of wheels 102, either vertical or horizontal, through initiation of the previously mentioned suspension system. These suspension controls may include, for example, electrical, hydraulic, pneumatic or any other desired control system. As shown in FIGS. 2 and 9, the suspension control system may enable a user to manually control the positioning of the wheels 102 while approaching, traveling on and exiting the rail system 108.

As shown in FIG. 11, in some exemplary embodiments, HPT vehicle 100 may include a bearing plate 106 on a bottom surface thereof. In an exemplary embodiment, the bearing plate 106 may include an array of bearings 107 coupled thereto. The bearing plate 106 can be disposed such that, when HPT vehicle 100 is engaged with a rail 108, the bearings 107 interface with the top portion 108*a* of rail 108. Furthermore, the bearing plate 106 may be configured so as to substantially surround the top and side surfaces of the top portion 108a of rail 108 when vehicle 100 is engaged with rail 108, thereby facilitating stability of vehicle 100 on rail 108. Bearings 107 may be formed in any known manner that enables HPT vehicle 100 to function as described herein. For example, bearings 107 may be formed from shock absorbing and resilient materials such as rubber, and may further be pneumatic. In some exemplary embodiments, bearings 107 may be surfaced with any desired material designed to reduce friction and/or dissipate heat, for example, rubber or plastic. The bearings 107 may also be made of metal or any other structure capable of retaining shape and supporting the weight of the HPT vehicle 100. The number and size of bearings 107 may vary as desired. In a further exemplary embodiment, the positioning of bearing plate 106 may be manipulated by an onboard control system or some other desired remote location.

Figure 12A:
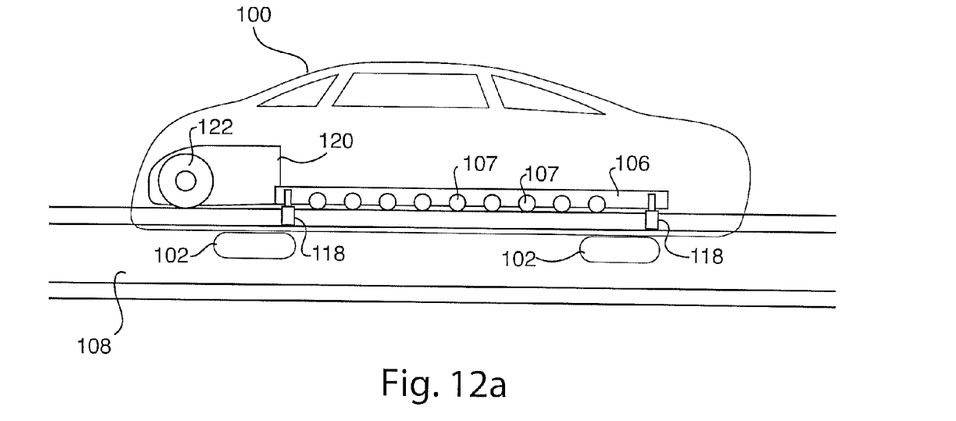
FIG. 12A is a side view of an exemplary embodiment of a supplementary propulsion system for an HPT vehicle.

In some exemplary embodiments, as shown in FIG. 12a, HPT vehicle 100 may include a plurality of positioning rollers 118 extending so as to engage rail 108. Positioning rollers 118 can rotate about a substantially vertical axis of rotation, and can engage top portion of rail 108 so as to further laterally stabilize HPT vehicle 100 on rail 108. Positioning rollers 118 may be made from any material that enables vehicle 100 to function as described herein, for example, metal, plastic, rubber, and the like.

In some exemplary embodiments, HPT vehicle 100 may include a supplementary drive system 120, as shown in FIG. 12a. Supplementary drive system 120 can include a contact drum 122 for engaging the top portion of rail 108. Contact drum 122 may be powered by a motor provided as part of supplementary drive system 120. Supplementary drive system 120 can further be adapted for regenerative braking via contact drum 122 and the associated motor. To that end, a rechargeable battery or other energy storage apparatus may be provided as part of supplementary drive system 120. The regenerative braking ability of supplementary power system 120 may be implemented substantially as known to one skilled in the art.

Figure 12B:
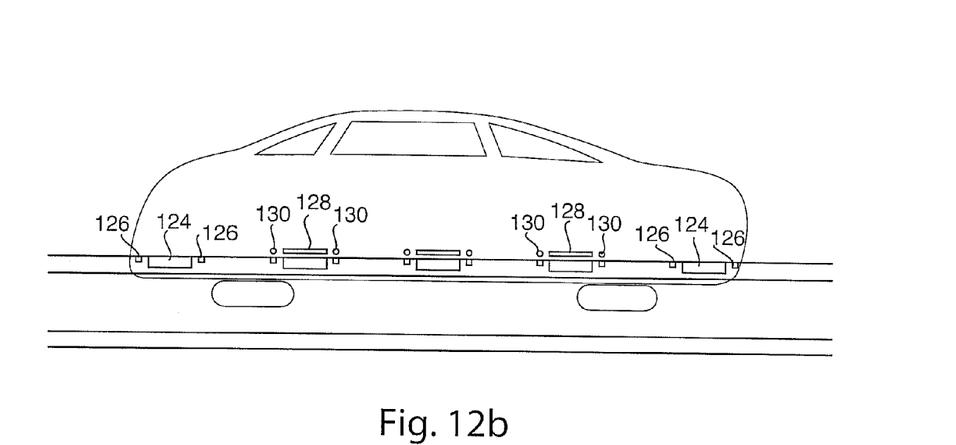
FIG. 12B is a side view of an exemplary embodiment of a linear induction drive system for an HPT vehicle.

In some exemplary embodiments, as shown in FIG. 12b, HPT vehicle 100 and rail 108 may include a linear induction drive system, for example a low-acceleration linear induction system. The linear induction drive system may be implemented by a plurality of electromagnets 124 arranged at desired intervals within the rail 108, and a plurality of sensor switches 126 arranged between the electromagnets 124. HPT vehicle 100 may be provided with at least one permanent magnet 128 and at least one pair of actuators 130 arranged peripherally to the permanent magnet 128. The at least one permanent magnet 128 and actuators 130 can be disposed such that, when vehicle 100 is engaged with rail 108, actuators 130 can interact with sensor switches 126 and permanent magnet 128 can interact with electromagnets 124. The linear induction drive system may operate as known to one skilled in the art. For example, actuators 130 can interact with sensor switches 126 so as to alter the polarity of the corresponding electromagnet 124, which, by interaction with permanent magnet 128, can result in the propulsion, acceleration or deceleration of HPT vehicle 100.

Exemplary embodiments of rails for use with HPT vehicle 100, as well as support structures for the rails are described below. While exemplary measurements for the rails and support structures are discussed, it should be appreciated that the rails and support structures may have any desired structural configurations, dimensions and measurements that enable the HPT system to function as described herein while satisfying desired design and engineering considerations.

Figure 13A:
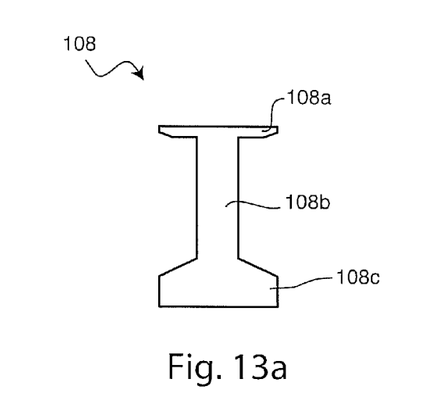
FIG. 13A is an exemplary embodiment of a rail for an HPT system.

In an exemplary embodiment, an HPT rail 108 may be manufactured in an I-beam type configuration, as seen in FIGS. 11 and 13a. This I-beam type design can enable the horizontal wheels 105 of the HPT vehicle to secure the vehicle 100 to the rail 108 during transit. The rail 108 can include an upper flange 108a, a central support 108b, and a base flange 108c. In am exemplary embodiment, the upper flange 108a may be engaged by bearings 107 of bearing plate 106, positioning rollers 118, and/or contact drum 122 of supplementary drive system 120, while central support 108b may be engaged by wheels 102. In some exemplary embodiments, as shown in FIG. 11, upper flange 108a can include additional bearings 108d. The additional bearings 108d can engage a portion of the hub of a wheel 102 so as to achieve desired spacing between wheel 102 and rail 108 and facilitate additional stability of HPT vehicle 100. The additional bearings 108d may be rotatably mounted within rail 108 so as to facilitate a low friction engagement between wheel 102 and bearings 108d.

In an exemplary embodiment, the rail 108, or portions thereof, may be made of any suitable material that facilitates smooth travel on the rail, for example, seamless stainless steel, titanium, concrete, specially formulated plastic, or any other robust material that may provide a smooth and sufficiently strong material to support multiple HPT vehicles 100 traveling along the rail 108. The surfaces of portions of rail 108, for example the upper surface of upper flange 108a may be uniform and without substantial surface deviations that may cause turbulence for HPT vehicles traveling on the rail. In yet another exemplary embodiment, the HPT vehicle 100 may be alternatively or additionally equipped with a magnetic levitation feature which may reduce turbulence in the vehicle 100 and increase the speed capabilities of the vehicle 100.

Figure 5:
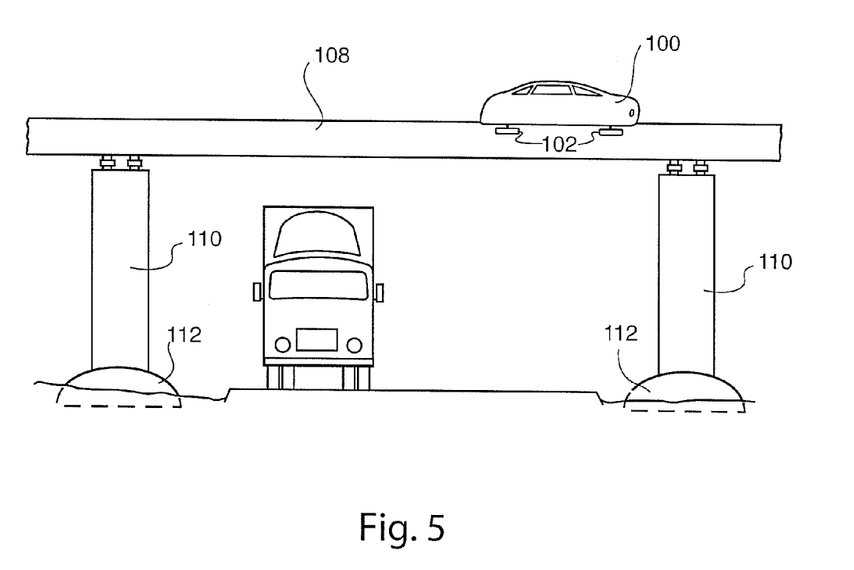
FIG. 5 is side view of another exemplary embodiment of an HPT system.

In some exemplary embodiments, the HPT rails 108 may be supported above-grade on pillars 110, as seen in FIGS. 2-5, 9, 11a and 13b-13d. The rails 108 may secured to the pillars via fasteners 109, which may be bolts, or any other desired securing mechanism. Furthermore, in some exemplary embodiments, a shim plate 111 may be provided between rail 108 and a pillar 110. Pillars 110 may be supported underneath the ground surface by anchors 112. Anchors 112 can be made in any desired shape or size so as to add additional support and stability to pillars 110. Pillars 110 may have any desired height, for example, a height sufficient to provide clearance for any vehicles that may travel below the rail 108, as shown in FIG. 5.

Figure 13B:
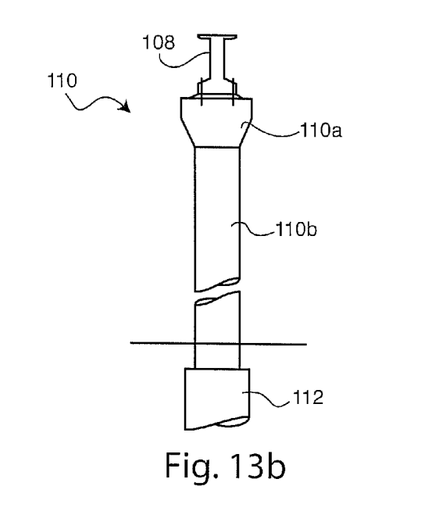
FIGS. 13B-13D are exemplary embodiments of supports for an HPT system.

FIG. 13b shows an exemplary embodiment of a pillar 110 for supporting a single rail 108. Pillar 110 may include a top 110a, a column 110b and an anchor 112. Exemplary dimensions for pillar 110 may be as follows. Top 110a may have a diameter of about 4 feet and a height of about 3 feet. Top 110a may taper as it approaches column 110b. Column 110b may have a diameter of about 2 feet 9 inches, while the height of column 110b may vary as desired. Anchor 112 may have a diameter of about 4 feet and a height sufficient to stabilize pillar 110 and the rail 108 thereon.

Figure 13C:
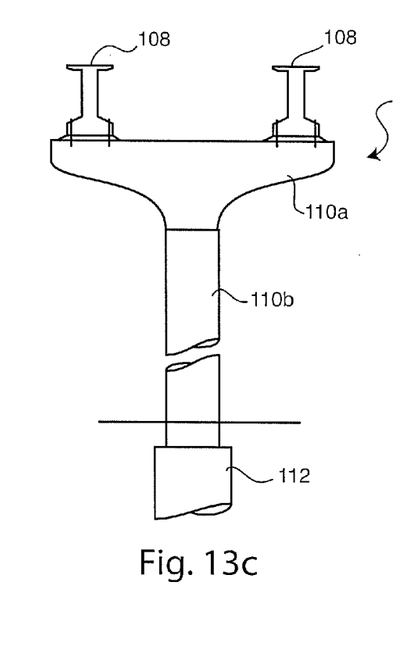

FIG. 13c shows another exemplary embodiment of a pillar 110 for supporting a pair of rails 108. Pillar 110 may include a top 110a, a column 110b and an anchor 112. Exemplary dimensions for pillar 110 may be as follows. Top 110aa may have a width of about 20 feet 2 inches and a height of about 6 feet 2 inches. A pair of rails 108 may be disposed on top of top 110 such that the distance between the centerlines of the rails is about 16 feet 2 inches. Column 110b may have a diameter of about 4 feet, while the height of column 110b may vary as desired. Anchor 112 may have a diameter of about 6 feet and a height sufficient to stabilize pillar 110 and the rail 108 thereon.

Figure 13D:
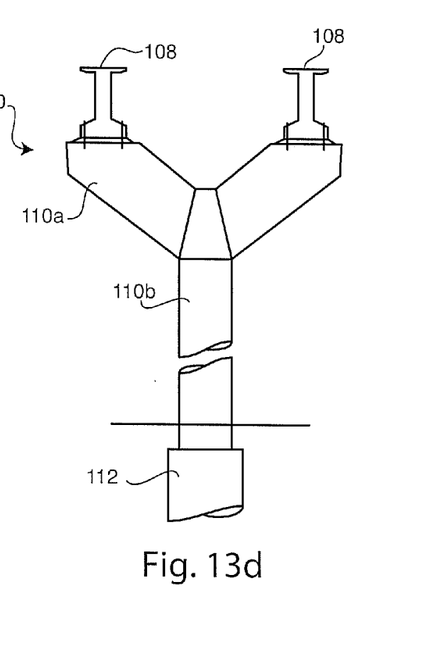

FIG. 13d shows another exemplary embodiment of a pillar 110 for supporting a pair of rails 108. Pillar 110 may include a top 110a, a column 110b and an anchor 112. Exemplary dimensions for pillar 110 may be as follows. Top 110a may have a bifurcated shape. Top 110a have a width of about 20 feet 2 inches and a height of about 8 feet. A pair of rails 108 may be disposed on top of top 110a such that the distance between the centerlines of the rails is about 16 feet 2 inches. Column 110b may have a diameter of about 4 feet, while the height of column 110b may vary as desired. Anchor 112 may have a diameter of about 6 feet and a height sufficient to stabilize pillar 110 and the rail 108 thereon.

Figure 10:
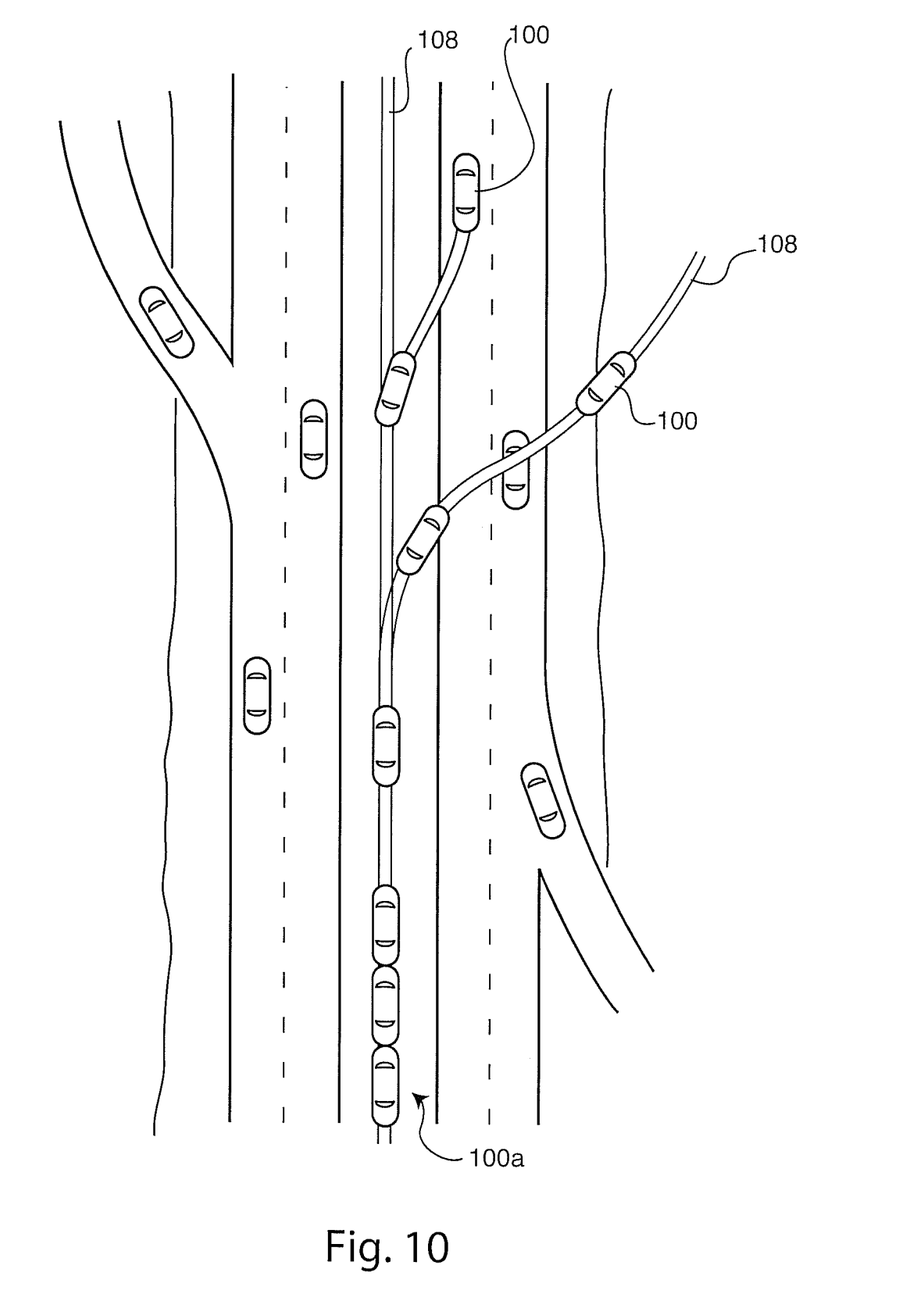
FIG. 10 is top view of an exemplary embodiment of an HPT system in relation to a conventional vehicle highway.

In another exemplary embodiment of the HPT system, a series of rails 108 may operate in conjunction with one another forming a grid, as seen in FIG. 10. During operation of the HPT system, an operator of an HPT vehicle 100 may arrive at a grid entrance, where the HPT vehicle 100 may be operated electronically by a series of onboard operating systems 800 and grid operating systems 602. A vehicle operator may engage a grid system through a special lane which may provide a smooth, merging transition onto the grid system.

In an exemplary embodiment, an onboard operating system 800 may communicate with a grid operating system 602 which may provide automatic operation, or free of vehicle operator operation, of the vehicle 100 during its interaction with the grid and HPT system. The HPT vehicle 100 may run on conventional tires 102 during the approach to the rail 108 and grid system.

In another exemplary embodiment, an HPT vehicle 100 is identified as being registered for access on the rail 108 and grid system, for example, through an electronic identification tag, transponder, or any other desired registration system. The grid operating system 602 of the HPT system may send the approaching HPT vehicle 100 a signal to conduct a series of electronic diagnostic checks to make certain that the required systems on the HPT vehicle may be working properly for safe access onto the rail 108 and pending transit.

For example, the diagnostic checks may include sufficient battery charge (or fuel quantity for automobiles with traditional propulsion systems), vehicle brake pad thickness (which may be electronically checked), or any other designated or desired diagnostic checks. Additionally, the HPT vehicle's on-board operating system 800 may be checked for strength of signal and full interaction with the grid operating system 602. In an exemplary embodiment of the HPT system, if required functions of the HPT vehicle 100 are not in compliance with the HPT system requirements, the HPT vehicle 100 may be diverted to a lane which may return to conventional highway lanes.

The HPT vehicle may also be equipped with indicators, for example lights or video screens, which may indicate when a vehicle operator must enter required information into the onboard operating system 800. This information may include, for example, the desired entry point for entering the HPT system, as well as the desired exit for returning the vehicle 100 to the conventional roadway. The information may be provided by entering a known code corresponding to the desired location, or by selecting the desired location on a displayed map. If certain required information is not entered the vehicle may be exited off the rail 108 at the next available exit. Additionally, if a vehicle operator is unfamiliar with the required information the onboard operating system may prompt the vehicle operator with possible selections. The HPT system grid operating system 602 may also exit the vehicle 100 off the rail 108 in emergency-type situations that may be initiated by the vehicle operator or the grid operating system 602 itself.

Figure 6:
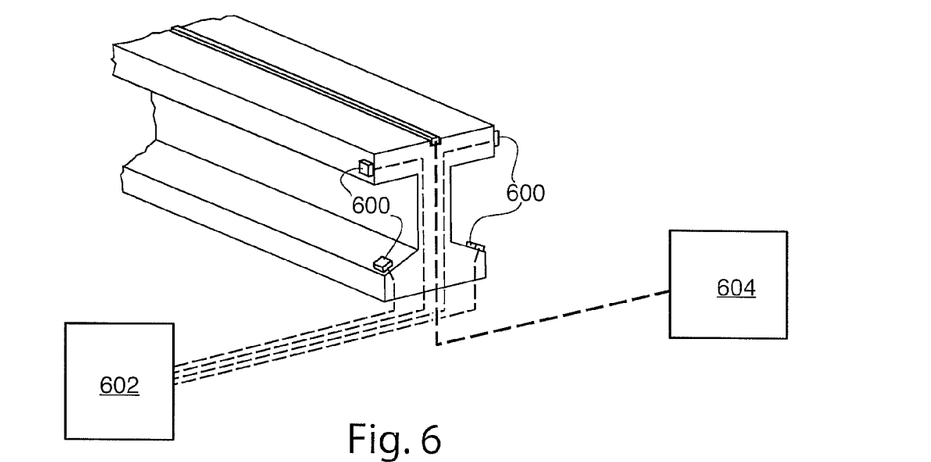
FIG. 6 is a perspective cross-sectional view of an exemplary embodiment of a HTP rail.
Figure 7:
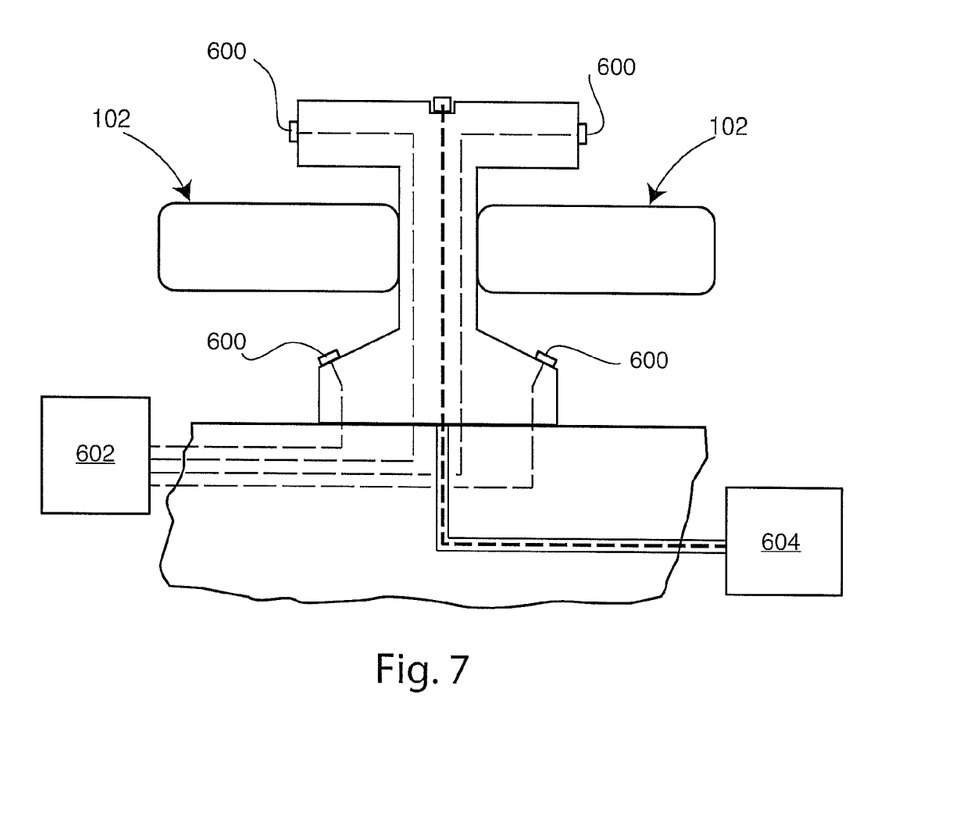
FIG. 7 is a cross-sectional schematic view of an HPT rail and system.
Figure 8:
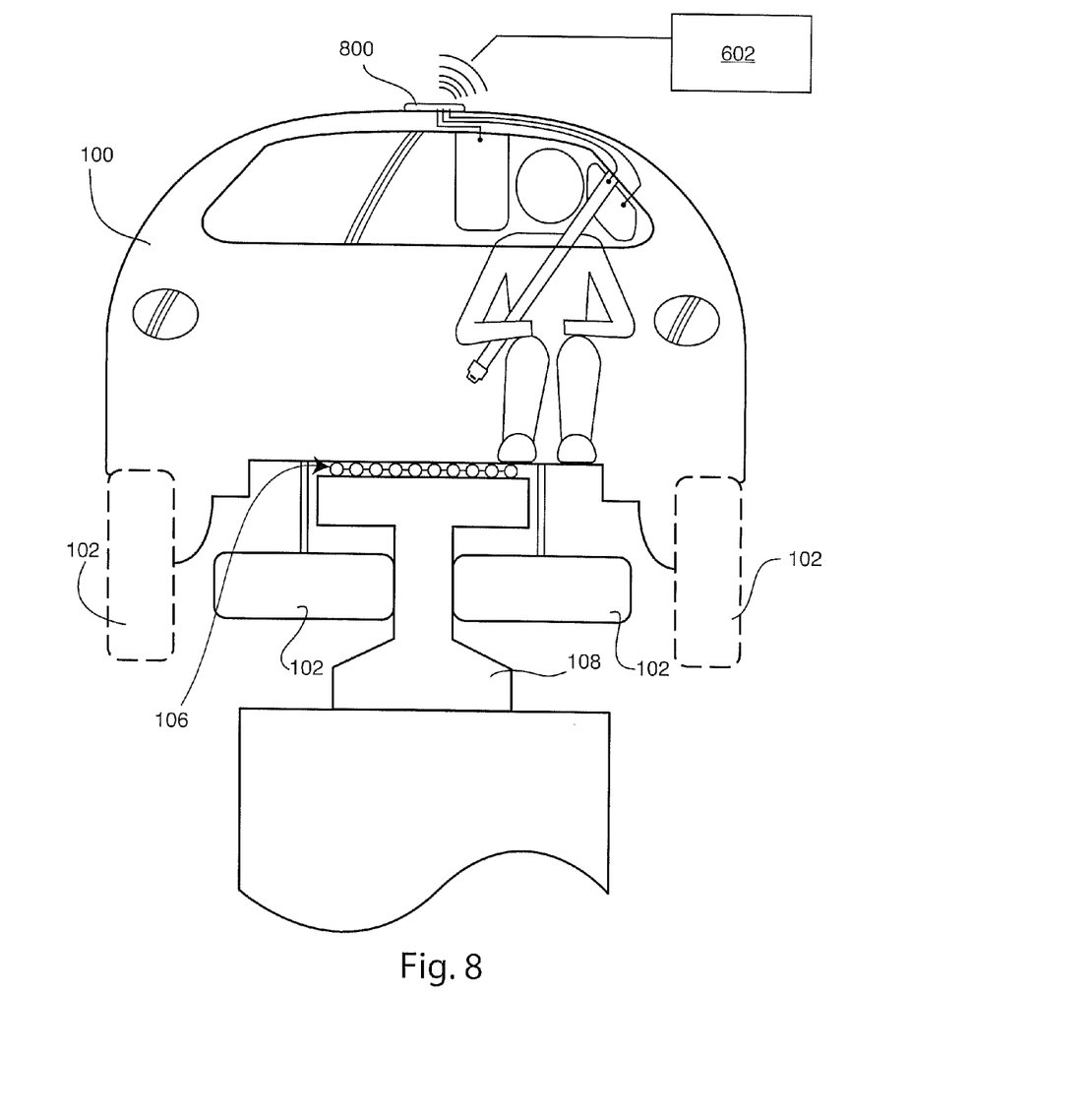
FIG. 8 is front view of an exemplary embodiment of an HPT vehicle in communication with the grid operating system of the HPT system.

As seen in FIGS. 6-8, the HPT vehicle 100 may communicate with the grid operating system 602 at designated intervals, for example, every 6 feet, via sensors 600 placed along the rail 108. These sensors 600 may come into direct contact with the vehicle or may communicate with the vehicle trough electronic signals sent by the grid operating system 602. The grid operating system may communicate with the HPT vehicle 100 and at each sensor and determine, for example, how fast the HPT vehicle 100 is moving, the rate of acceleration, the exact speed the HPT vehicle 100 and any other desired information that may be necessary for the grid operating system 602 monitor and control the HPT vehicle 100. Additionally, a power source 604 may be incorporated into the rail 108 and provide additional power to HPT vehicle 100 and the other electrical operating systems of the HPT system.

The grid operating system 602 may control the HPT vehicle 100 and may subsequently control the interaction and transit flow patterns of multiple HPT vehicles 100. For example, the grid operating system 602 may cause the vehicle to accelerate and catch up to at least one other vehicle 100, or may cause the vehicle to remain at designated speed so as to let at least one vehicle 100 behind it catch up. In some exemplary embodiments, a trailing vehicle may accelerate to five miles per hour over the traveling speed of a leading vehicle. When the trailing vehicle is in proximity to the leading vehicle, the grid operating system 602 can slow down the trailing vehicle to one mile per hour over the traveling speed of the leading vehicle, with the speed differential gradually decreasing as coupling is approached. Grid operating system 602 can thus form a train 100a of at least two HPT vehicles 100.

The at least two vehicles 100 that constitute train 100a may be physically coupled to each other via any vehicle coupling structure known in the art that enables the HPT system to function as described herein. In some exemplary embodiments, each HPT vehicle 100 may be provided with electromagnets at the front and rear of the vehicle. The polarity of the magnets may be switched so as to cushion coupling impact as well as to maintain cushioning after coupling, as well as facilitating coupling. In yet other exemplary embodiments, rather than physically coupling the vehicles, operating system 602 can place the vehicles 100 in sufficient proximity to each other so as to place a following vehicle 100 in the slipstream of the next leading vehicle 100. This can creating a draft effect between any two vehicles 100 in train 100a, thereby reducing drag and reducing energy requirements. As all vehicles in a train 100a may be traveling at substantially identical velocities, the likelihood of a collision between two vehicles traveling at high differential speed can therefore also be reduced. In another exemplary embodiment, the grid operating system 602 may recognize the fuel and energy efficiencies in controlling the flow of transit along the rail 108 and determining designated speeds and "train" organizations of the HPT vehicles 100.

Additional features of an HPT vehicle may also include an electronic cloaking effect can be used to fully shade the windows of the HPT vehicle if vehicle operator wants to have some privacy, the vehicle operator can elect to see the scenery outside or block out the view completely. The HPT vehicle may also be compatible with a band which may be placed around the vehicle operator's wrist which, through, for example, radio frequency, may communicate to the onboard operating system 800, and the grid operating system 602, if, for example, the vehicle operator's heartbeat is irregular, blood pressure is too high or low, or if other medical conditions exist which may require immediate medical attention. If the vehicle operator were to go into cardiac arrest, for example, the HPT vehicle 100 may exit the rail 108 at the next available exit and emergency personnel may be standing by to meet the HPT vehicle 100 in the with advance knowledge of vehicle operator's condition.

A HPT vehicle 100 may also incorporate a safety cage or hull that may be made of carbon fiber or any other robust material and may be egg shaped or any other desired shape which could act as a safety mechanism for passengers in the vehicle 100. The interior and seats of the HPT vehicle 100 may also include active occupant protection, for example active head and neck protection. The active protection may be provided by any technology known in the art, for example air bags or movable seat members. In some exemplary embodiments, heads-up visual displays and audible alerts may also be provided for indicating to the driver the presence of any irregular condition or hazard.

The grid operating system 602 may also follow the movement of each HPT vehicle in a train, and detect unusual or irregular conditions in the system. Such conditions may include, but are not limited to, a disabled vehicle, a vehicle having an occupant with a medical condition, or any other condition affecting regular system performance. Should such a condition be present, the grid operating system 602 may slow other vehicles 100 accordingly, reroute vehicles 100 around the location of the condition if possible, and notify appropriate personnel of the unusual condition. If the unusual condition is present in a train 100, the grid operating system 602 may disconnect the particular vehicle having the condition from the train 100a. In the event of failure of an electric motor, the HPT vehicle 100 may be capable of traveling to an exit by operation of the remaining functional motors; however, traveling speeds may be reduced.

In some exemplary embodiments, the contact pressure between the tires of wheels 102 and rail 108 may be optimized so as to provide a minimal amount of contact sufficient to maintain tire traction with rail 108 and to propel the vehicle 100. As a significant amount of vehicle weight is borne by bearing plate 106, this can facilitate minimizing tire strain and prolonging tire life. In the event of tire failure, the particular wheel 102 may be retracted from the horizontal position into the vertical position and the vehicle may be directed towards the nearest exit.

In some exemplary embodiments, if an emergency is sensed by any of the operating systems 602 or 800, the pressure between wheels 102 and rail 108 may be increased. This may be facilitated by further extending the variable-length actuator 168 for at least one wheel 102 so as to move the wheel 102 into higher-pressure contact with rail 108. This may be implemented in cases of emergency, where rapid deceleration is desired. Any occupant protection features may be deployed in conjunction with the rapid deceleration so as to facilitate passenger safety.

In some exemplary embodiments, wherein magnetic levitation is used for propulsion, wheels 102 on the HPT vehicle 100 may retract slightly away from the rail 108 during operation, thereby facilitating providing a smoother and more efficient transit on the rail 108. If for example, the HPT vehicle 100, through the use of the onboard operation system 800, senses a loss of magnetic levitation energy, during magnetic levitation use, the wheels 102 will immediately re-take control of the vehicle 100 and the internal engine may engage for onboard propulsion. If magnetic levitation is not in use, the vehicle 100 may remain connected to the rail 108 by the wheels 102.

Each rail-compliant vehicle 100 may also have a radar type sensor to alert the occupants of a higher than usual differential speed between two vehicles 100. The sensor may also communicate with onboard operating system 800 to vary the speed of the vehicle 100. In some exemplary embodiments, the driver may have an override option but its use may affect all, or most, of the vehicles in that driver's train. While grid operating system 602 is operable control the interaction and transit flow patterns of multiple HPT vehicles 100, in the event of failure of system 602, the sensor in conjunction with onboard operating system 800 may serve to maintain safe distances between multiple vehicles 100. Furthermore, in the event of an imminent collision, the sensor in conjunction with onboard operating system 800 may be operable to increase tension in any restraint systems, prime any active protection systems, and otherwise initiate the safety systems of the car in anticipation of the collision.

In another exemplary embodiment, as the HPT vehicle 100 exits the rail 108 the grid operating system may communicate to the HPT vehicle 100 to accelerate its conventional tires 102 to the speed corresponding to the rail 108 departure speed. After departure from the rail 108 is complete, the vehicle operator may be prompted by the onboard operating system 800 to take control of the vehicle 100, at which time the vehicle operator may regain manual control of the vehicle 100. Additionally, the wheels 102 may be automatically retracted into a protected and safe position or any other desired position.

In another exemplary embodiment, the rail 108 may not be affected by migrant animals, high winds, rain or snow conditions since it may be a fixed, non-flexible guideway, elevated above the debris field which accumulates on surface roadways and may be climate controlled. Exhaust emissions, noise pollution, and light pollution may also be greatly diminished.

The foregoing description and accompanying drawings illustrate the principles, preferred embodiments and modes of operation of the invention. However, the HPT system should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the HPT system as defined by the following claims.

The invention claimed is:

1. A personal transit vehicle comprising:
   an enclosure;
   a suspension system including a plurality of wheels, the suspension system adapted to control a positioning of the wheels over a range from substantially vertical to substantially horizontal and comprising:
      at least one subframe;
      a motor within a motor housing pivotably coupled on a first side to the subframe by a plurality of suspension arms, and coupled at a second side to one of the plurality of wheels;
      at least one variable length actuator coupled between the motor housing and the at least one subframe, wherein the at least one variable actuator is extendable to pivotably move the at least one motor housing from a first position to a second position;
      an electrical pickup connector extending from the second side of the motor housing; and a supplementary drive system adapted for regenerative braking via at least one contact drum, wherein in the first position the positioning of the wheels is substantially vertical for engaging a road surface; and wherein in the second position, the positioning of the wheels is substantially horizontal for engaging a rail, wherein in the second position the electrical pickup connector is in electrical communication with an electric supply of the rail.

2. The personal transit vehicle of claim 1, wherein the personal transit vehicle includes a bearing plate coupled to a bottom portion of the personal transit vehicle, the bearing plate adapted to engage a top surface of the rail.

3. The personal transit vehicle of claim 2, wherein the bearing plate includes a plurality of bearings that support the weight of the personal transit vehicle during rail-guided operation.

4. The personal transit vehicle of claim 1 further comprising: an onboard operating system that operates the personal transit vehicle from a remote location.

5. The personal transit vehicle of claim 4, wherein the onboard operating system adjusts the power of the drive wheels.

6. The personal transit vehicle of claim 4, wherein the onboard operating system controls the road wheel suspension system.

7. The personal transit vehicle of claim 1, further comprising a linear induction drive system.

8. A personal transit vehicle rail system comprising:
at least one rail, the rail including a top portion and a center portion, wherein the center portion has a narrower cross-sectional width than the top portion; and
a plurality of sensors configured to communicate with at least one personal transit vehicle
wherein the personal transit vehicle comprises:
an enclosure;
a suspension system including a plurality of wheels, the suspension system adapted to control a positioning of the wheels over a range from substantially vertical to substantially horizontal, the suspension system further comprising:
at least one subframe;
a motor within a motor housing pivotably coupled on a first side to the subframe by a plurality of suspension arms, and coupled at a second side to one of the plurality of wheels;
at least one variable length actuator coupled between the motor housing and the at least one subframe, wherein the at least one variable actuator is extendable to pivotably move the at least one motor housing from a first position to a second position; and
an electrical pickup connector extending from the second side of the motor housing;
a supplementary drive system adapted for regenerative braking via at least one contact drum.

9. The personal transit vehicle rail system of claim 8, wherein the plurality of sensors communicate with the personal transit vehicle via radio frequency.

10. The personal transit vehicle rail system of claim 8, wherein the plurality of sensors provide communication between the personal transit vehicle and a remote operating system.

11. The personal transit vehicle rail system of claim 8, further comprising: a power source which provides electrical power to the personal transit vehicle.

12. The personal transit vehicle rail system of claim 8, wherein the suspension system adapted to control a positioning of the wheels over a range from substantially vertical to substantially horizontal.

13. The personal transit vehicle rail system of claim 8, wherein the personal transit vehicle comprises a bearing plate coupled to a bottom portion of the personal transit vehicle, the bearing plate adapted to engage a top surface of the rail.

* * * * *